(12) United States Patent
Choi et al.

(10) Patent No.: US 11,939,489 B2
(45) Date of Patent: Mar. 26, 2024

(54) SOLUTION COMPOSITION FOR SURFACE TREATMENT OF STEEL SHEET AND SURFACE-TREATED STEEL SHEET USING SAME

(71) Applicants: POSCO, Pohang-si (KR); NOROO COIL COATINGS CO., LTD., Pohang-si (KR)

(72) Inventors: Chang-Hoon Choi, Pohang-si (KR); Dong-Yun Kim, Anyang-si (KR); Min-Ho Jo, Pohang-si (KR); Jae-Duck Ko, Anyang-si (KR); Won-Ho Son, Pohang-si (KR); Jong-Hwa Kim, Pohang-si (KR)

(73) Assignees: POSCO CO., LTD, Pohang-si (KR); NOROO COIL COATINGS CO., LTD., Pohang-si (KR)

( * ) Notice: Subject to any disclaimer, the term of this patent is extended or adjusted under 35 U.S.C. 154(b) by 1251 days.

(21) Appl. No.: 16/337,575

(22) PCT Filed: Sep. 28, 2017

(86) PCT No.: PCT/KR2017/010862
§ 371 (c)(1),
(2) Date: Mar. 28, 2019

(87) PCT Pub. No.: WO2018/062912
PCT Pub. Date: Apr. 5, 2018

(65) Prior Publication Data
US 2020/0032080 A1 Jan. 30, 2020

(30) Foreign Application Priority Data
Sep. 28, 2016 (KR) .......... 10-2016-0124991

(51) Int. Cl.
| | | |
|---|---|---|
| *C09D 5/08* | (2006.01) |
| *C08G 77/04* | (2006.01) |
| *C08K 3/24* | (2006.01) |
| *C08K 3/30* | (2006.01) |
| *C08K 3/36* | (2006.01) |
| *C08K 5/05* | (2006.01) |
| *C08K 5/09* | (2006.01) |
| *C08L 83/06* | (2006.01) |
| *C09D 4/00* | (2006.01) |
| *C09D 7/40* | (2018.01) |
| *C09D 133/08* | (2006.01) |
| *C09D 175/04* | (2006.01) |
| *C09D 183/04* | (2006.01) |

(52) U.S. Cl.
CPC .......... *C09D 5/08* (2013.01); *C08K 3/24* (2013.01); *C08K 3/36* (2013.01); *C08K 5/05* (2013.01); *C08K 5/09* (2013.01); *C09D 4/00* (2013.01); *C09D 7/67* (2018.01); *C09D 133/08* (2013.01); *C09D 175/04* (2013.01); *C09D 183/04* (2013.01); *C08G 77/04* (2013.01); *C08K 2003/309* (2013.01); *C08K 2201/005* (2013.01); *C08L 83/06* (2013.01)

(58) Field of Classification Search
CPC .. C09D 133/08; C09D 133/10; C09D 133/12; C08K 3/36
See application file for complete search history.

(56) References Cited

U.S. PATENT DOCUMENTS

| | | | |
|---|---|---|---|
| 4,407,899 A | 10/1983 | Hara et al. | |
| 5,804,616 A | 9/1998 | Mowrer et al. | |
| 6,090,873 A | 7/2000 | Okibe et al. | |
| 2002/0114959 A1* | 8/2002 | Kang | A43B 1/00 428/447 |
| 2002/0148538 A1 | 10/2002 | Yoon et al. | |
| 2003/0180520 A1* | 9/2003 | Saitou | C08J 7/123 428/304.4 |
| 2005/0245633 A1 | 11/2005 | Soutar et al. | |
| 2005/0260421 A1 | 11/2005 | Wielstra et al. | |
| 2006/0177685 A1 | 8/2006 | Matsuda et al. | |
| 2010/0144925 A1 | 6/2010 | Cabrera et al. | |
| 2010/0159144 A1* | 6/2010 | Standke | C09D 5/08 427/387 |
| 2010/0178478 A1* | 7/2010 | Bae | C08K 3/40 524/588 |
| 2010/0189993 A1 | 7/2010 | Mori et al. | |
| 2010/0197867 A1 | 8/2010 | Niimi et al. | |
| 2010/0204388 A1 | 8/2010 | Marsh et al. | |
| 2011/0118382 A1 | 5/2011 | Reichenbach-Klinke et al. | |
| 2014/0302311 A1 | 10/2014 | Yoo et al. | |
| 2016/0215361 A1 | 7/2016 | Yoon et al. | |
| 2017/0369735 A1 | 12/2017 | Kwak et al. | |
| 2018/0010206 A1 | 1/2018 | Kwon et al. | |

FOREIGN PATENT DOCUMENTS

| | | |
|---|---|---|
| CA | 2111322 | 6/1994 |
| CN | 1181775 | 5/1998 |
| CN | 1906253 | 1/2007 |
| CN | 101208397 | 6/2008 |
| CN | 101522834 | 9/2009 |
| CN | 102037023 | 4/2011 |
| CN | 102666921 | 9/2012 |
| CN | 103911031 | 7/2014 |
| CN | 105671457 | 6/2016 |
| CN | 107109511 | 8/2017 |

(Continued)

OTHER PUBLICATIONS

European Search Report—European Application No. 17856798.8, dated Nov. 27, 2019.

(Continued)

*Primary Examiner* — Brieann R Johnston

(74) *Attorney, Agent, or Firm* — CANTOR COLBURN LLP

(57) ABSTRACT

Provided is a composition for surface treatment of a steel sheet, the composition having excellent resistance to an acid, such as sulfuric acid, and to a coated steel sheet to which the composition for surface treatment is applied, wherein the composition for surface treatment comprises 30-50% wt % of colloidal silica containing 5-20 nm-sized silica, 40-60% wt % of silane containing three or more alkoxy groups, 5-15 wt % of an acrylate-based organic monomer, 0.01-1 wt % of an acid, and 1-15 wt % of a solvent.

6 Claims, 2 Drawing Sheets

(56) References Cited

FOREIGN PATENT DOCUMENTS

| | | |
|---|---|---|
| IN | 2527DEL2008 | 5/2010 |
| JP | 61060766 | 3/1986 |
| JP | 2007126699 | 5/2007 |
| JP | 2014237880 | 12/2014 |
| KR | 1019940014527 | 7/1994 |
| KR | 1019970027365 | 6/1997 |
| KR | 1019970043276 | 7/1997 |
| KR | 1019980009517 | 4/1998 |
| KR | 1019990007963 | 1/1999 |
| KR | 1019990053056 | 7/1999 |
| KR | 1020000070531 | 11/2000 |
| KR | 1020010038131 | 5/2001 |
| KR | 1020010106334 | 11/2001 |
| KR | 1020010109931 | 12/2001 |
| KR | 1020020051320 | 6/2002 |
| KR | 200280434 | 7/2002 |
| KR | 1020030042985 | 6/2003 |
| KR | 1020030043192 | 6/2003 |
| KR | 1020030047469 | 6/2003 |
| KR | 1020030047470 | 6/2003 |
| KR | 1020030054349 | 7/2003 |
| KR | 1020030056671 | 7/2003 |
| KR | 1020040038292 | 5/2004 |
| KR | 1020040059977 | 7/2004 |
| KR | 1020050064633 | 6/2005 |
| KR | 1020050068072 | 7/2005 |
| KR | 1020060037339 | 5/2006 |
| KR | 1020060074296 | 7/2006 |
| KR | 1020060083382 | 7/2006 |
| KR | 1020070067330 | 6/2007 |
| KR | 1020070067809 | 6/2007 |
| KR | 100775311 | 11/2007 |
| KR | 100787737 | 12/2007 |
| KR | 1020080046114 | 5/2008 |
| KR | 1020080105229 | 12/2008 |
| KR | 1020090046262 | 5/2009 |
| KR | 1020090049371 | 5/2009 |
| KR | 1020100037058 | 4/2010 |
| KR | 1020100067533 | 6/2010 |
| KR | 1020100068094 | 6/2010 |
| KR | 1020100068095 | 6/2010 |
| KR | 1020100079436 | 7/2010 |
| KR | 1020100108104 | 10/2010 |
| KR | 101004817 | 12/2010 |
| KR | 1020110068731 | 6/2011 |
| KR | 101058061 | 8/2011 |
| KR | 1020110123757 | 11/2011 |
| KR | 1020120011258 | 2/2012 |
| KR | 1020120011259 | 2/2012 |
| KR | 1020120032886 | 4/2012 |
| KR | 1020120032887 | 4/2012 |
| KR | 1020120060457 | 6/2012 |
| KR | 101180060 | 9/2012 |
| KR | 1020120097728 | 9/2012 |
| KR | 1020120111050 | 10/2012 |
| KR | 101197732 | 11/2012 |
| KR | 101220861 | 1/2013 |
| KR | 1020130022874 | 3/2013 |
| KR | 1020130045000 | 5/2013 |
| KR | 1020130076117 | 7/2013 |
| KR | 101310324 | 10/2013 |
| KR | 1020130143374 | 12/2013 |
| KR | 1020130143375 | 12/2013 |
| KR | 1020140009698 | 1/2014 |
| KR | 101405368 | 6/2014 |
| KR | 101424082 | 7/2014 |
| KR | 1020140118252 | 10/2014 |
| KR | 1020140137942 | 12/2014 |
| KR | 101499342 | 3/2015 |
| KR | 101499352 | 3/2015 |
| KR | 1020150029468 | 3/2015 |
| KR | 101521812 | 5/2015 |
| KR | 1020150049503 | 5/2015 |
| KR | 1020150057815 | 5/2015 |
| KR | 1020150062176 | 6/2015 |
| KR | 1020150066333 | 6/2015 |
| KR | 1020150073023 | 6/2015 |
| KR | 1020160042295 | 4/2016 |
| KR | 101634367 | 6/2016 |
| KR | 1020160070310 | 6/2016 |
| KR | 1020160077568 | 7/2016 |
| KR | 1020160082357 | 7/2016 |
| KR | 101657787 | 9/2016 |
| WO | WO-9938034 A1 * | 7/1999 ............... G02B 1/04 |
| WO | 2008062984 | 5/2008 |
| WO | 2015097762 | 7/2015 |
| WO | 2017113269 | 7/2017 |
| WO | 2019124865 | 6/2019 |

OTHER PUBLICATIONS

International Search Report—PCT/KR2017/010862 dated Feb. 19, 2018.
Chinese Office Action—Chinese Application No. 201780060164.5 dated Aug. 5, 2020.
European Search Report—European Application No. 17856798.8 dated Feb. 25, 2020.
Japanese Office Action—Japanese Application No. 2019-516601 dated May 26, 2020.

* cited by examiner

| Element | Wt% | At% |
|---|---|---|
| CK | 46.07 | 62.12 |
| OK | 15.55 | 15.75 |
| SiK | 38.38 | 22.13 |

# SOLUTION COMPOSITION FOR SURFACE TREATMENT OF STEEL SHEET AND SURFACE-TREATED STEEL SHEET USING SAME

TECHNICAL FIELD

The present disclosure relates to a composition for surface treatment of a steel sheet, having excellent in resistance to acid, such as sulfuric acid, and to a coated steel sheet to which the composition for surface treatment is applied.

BACKGROUND ART

Generally, when a fuel containing sulfur, or the like is burned, sulfur oxides, nitrogen oxides, and the like are generated, and when sulfur oxides, nitrogen oxides, and the like react with water, strong acids such as sulfuric acid, nitric acid, or the like are generated. Such strong acids may adhere to a surface of structure (formed of a material) such as metal, or the like, to precipitate dew point corrosion promoting corrosion.

To reduce such dew point corrosion, companies have used relatively expensive stainless steel or enamel steel sheets, or the like, or have applied sulfuric acid-resistant steel, which is relatively inexpensive and highly resistant to dew point corrosion. Corrosion reaction proceeds on the surface of the structure, and most materials, except the enamel steel sheet, have been used without a separate coating layer on the surface.

Techniques for preventing dew point corrosion are disclosed in Korea Patent Application Nos. 2013-0151739, 2013-0145717, 2013-0141627, 2013-0130161, and the like. However, all of these techniques are to improve corrosion resistance to strong acids through component adjustment of the steel sheet itself, and are different from the technique of inhibiting dew point corrosion by forming a coating layer on the surface of the steel sheet.

DISCLOSURE

Technical Problem

The present disclosure intends to improve corrosion resistance to strong acids, including the above-described dew point corrosion, through coating on the surface of the steel sheet, rather than through component adjustment of the steel sheet itself.

Technical Solution

An aspect of the present disclosure is to provide a solution composition for surface treatment of a steel sheet having excellent resistance to an acid, such as sulfuric acid, or the like. The solution composition for surface treatment of the steel sheet includes 30 to 50 wt % of colloidal silica containing 5 to 20 nm-sized silica particles, 40 to 60 wt % of silane containing three or more alkoxy groups, 5 to 15 wt % of an acrylate-based organic monomer, 0.01 to 1 wt % of an acid, and 1 to 15 wt % of a solvent.

The colloidal silica may have a silica content of 10 to 45 wt %.

The silane may be at least one selected from a group consisting of vinyl trimethoxy silane, vinyl triethoxy silane, vinyl tri-isopropoxy silane, 3-methacryloxypropyl trimethoxy silane, 2-glycidyloxy propyl trimethoxy silane, 2-glycidyloxy propyl triethoxy silane, 2-aminopropyl triethoxy silane, 2-ureidoalkyl triethoxy silane, tetraethoxysilane, triethoxyphenylsilane, and trimethoxyphenylsilane.

The organic monomer may be at least one selected from a group consisting of acrylic acid glacial, methyl acrylate, ethyl acrylate, butyl acrylate, 2-ethylhexyl acrylate, isobutyl acrylate, tertiary butyl acrylate, tertiary butyl methacrylate, butanediol monoacrylate, lauryl acrylate, dimethylaminoethyl acrylate, and dihydrodicyclopentadienyl acrylate.

The acid may be one or more selected from a group consisting of acetic acid, formic acid, lactic acid, glyconic acid, sulfuric acid, nitric acid, hydrochloric acid, and hydrofluoric acid.

The solvent may be at least one selected from a group consisting of methanol, ethanol, 2-propanol, 2-methoxypropanol, and 2-butoxyethanol.

The composition may further include 0.1 to 5.0 wt % of an organic resin having a cyclic ring structure.

The organic resin having the cyclic ring structure may be at least one selected from a group consisting of polyurethane; an amino-modified phenolic resin; a polyester resin; an epoxy resin; and polyvinyl butyral or a hybrid resin of two or more thereof.

Another aspect of the present disclosure is to provide a surface-treated steel sheet including a steel sheet and a corrosion-resistant film layer formed on at least one surface of the steel sheet. The corrosion-resistant film layer includes a product formed by a hydrolysis reaction of silica and alkoxy silane, and an acrylate-based polymer, and the corrosion resistant-film layer includes 25 to 65 wt % of carbon (C), 20 to 70 wt % of silicon (Si), 1 to 40 wt % of oxygen (O), and in which a ratio of silicon (Si) to oxygen (O) bonding (Si—O bonding) and silicon (Si) to carbon (C) bonding (Si to C bonding) is 80-95%: 5-20%.

The corrosion-resistant film layer may be formed by the above-described solution composition for surface treatment of the steel sheet.

The corrosion-resistant film layer may further include 0.1 to 5.0 wt % of an organic resin having a cyclic ring structure.

The organic resin having the cyclic ring structure may be at least one selected from a group consisting of polyurethane; an amino-modified phenol resin; a polyester resin, an epoxy resin; and polyvinyl butyral or a hybrid resin of two or more thereof.

The corrosion-resistant film layer may have a thickness of 0.1 to 50 μm.

It is more preferable that the steel sheet is a sulfuric acid-resistant steel.

The sulfuric acid-resistant steel may include 0.2 wt % or less of C (excluding 0), 1.5 wt % or less of Mn (excluding 0), 0.02 wt % or less of S, 0.02 wt % or less of P, 0.1 wt % or less of Al, and 0.1 to 0.5 wt % of Cu, and a remainder of Fe and other unavoidable impurities. The sulfuric acid-resistant steel may further include at least one of 0.03 to 0.1 wt % of Co, 0.3 wt % or less of Ni (excluding 0), and 0.3 wt % or less of Sb (excluding 0). Further, the sulfuric acid-resistant steel may be one in which at least one concentrated layer selected from a group consisting of Cu, Co, Ni, and Sb having a thickness of 100 to 300 nm is formed, directly below the surface.

In addition, the sulfuric acid-resistant steel may be a steel sheet containing 0.03 to 0.1 wt % of C, 0.15 to 0.35 wt % of Si, 0.5 to 1.2 wt % of Mn, 0.01 wt % or less of S, 0.015 wt % or less of P, 0.02 to 0.06 wt % of Al, 0.004 wt % or less of N, and 0.2 to 0.4 wt % of Cu, and a remainder of Fe and other avoidable impurities, and may further include at least one of 0.1 to 0.25 wt % of Ni, 0.05 to 0.2 wt % of Sb, and 0.03 to 0.1 wt % of Co. The sulfuric acid-resistant steel may be one in which at least one concentrated layer selected from a group consisting of Cu, Co, Ni, and Sb having a thickness of 100 to 300 nm is formed, directly below the surface.

Advantageous Effects

According to an aspect of the present disclosure, by coating the composition provided in the present disclosure on a surface of a steel sheet, corrosion resistance for sulfuric acid may be provided, even though the composition of the steel may not be changed.

Further, the surface treatment composition according to the present disclosure may provide excellent corrosion resistance to sulfuric acid and hydrochloric acid to the structure, thereby prolonging a life span of the steel sheet.

BEST MODE FOR INVENTION

Figure 1:
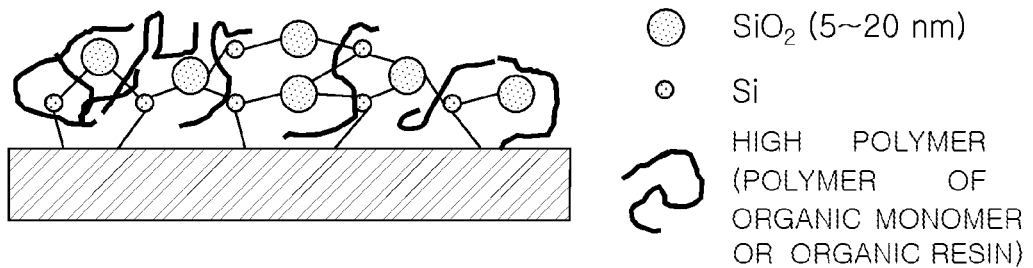
FIG. 1 is a view schematically illustrating a concept of forming a surface treatment film according to the present disclosure.

The present disclosure is to provide corrosion resistance to strong acids such as sulfuric acid, hydrochloric acid, or the like, and is not intended to provide an acid-resistant steel sheet through adjustment of components of a steel sheet itself, but to provide a surface treatment of imparting corrosion resistance to strong acids such as sulfuric acid, hydrochloric acid, or the like, for example, characteristics of acid resistance through coating.

For this, the present disclosure provide a solution composition for surface treatment capable of imparting characteristics of acid resistance to a steel sheet, and the solution composition for surface treatment provided by the present disclosure include colloidal silica, silane, an organic monomer, and the like.

The colloidal silica contained in the solution composition for surface treatment may form a film having a dense structure on the surface of the steel sheet to provide hardness to the film, as a main component for forming the surface treatment film of the steel sheet according to the present disclosure. In addition, the colloidal silica may be chemically bonded to silane during the film formation process to be coated on the surface of the steel sheet during the drying and curing process, thereby providing the acid resistance to the steel sheet.

The colloidal silica having a nanoscale particle size may be used. For example, the colloidal silica having a particle size of 5 nm to 50 nm may be used. When the particle size of the colloidal silica is less than 5 nm, a surface area of the silica is too wide to cause a shortage of the silane to react therewith, which causes the acid resistance to be inferior. On the other hand, when the particle size of the colloidal silica exceeds 50 nm, porosity between the silica may be high, there may be a problem in which the acid resistance is lowered. It is more preferable that the colloidal silica has a particle size of 5 to 20 nm.

It is more preferable that the colloidal silica includes 10 to 45 wt % of the content of silica. When the content is less than 10 wt %, the content of silica may be insufficient, causing the corrosion resistance of the film to be inferior, and when the content exceeds 45 wt %, silica particles may be excessively precipitated.

The colloidal silica may be contained to be 30 wt % to 50 wt % based on 100 wt % of the solution composition for a metal surface treatment. The content of silica may be a content of 3.0 to 22.5 wt % based on 100 wt % of the whole composition. When the content of the colloidal silica is less than 30 wt %, it may not be sufficiently bonded to the alkoxy silane, such that the hardness may be reduced, and the corrosion resistance to acids may not be secured. On the other hand, when the content of the colloidal silica exceeds 50 wt %, silica, which is not bonded to the silane, may remain, thereby deteriorating film formation ability, and thus corrosion resistance for acids may not be secured.

The solution composition for a metal surface treatment of the present disclosure may include silane. The silane may be bonded to silica in a sol-gel reaction, cross-link between silanes, and react with the surface of the steel sheet during drying to adhere the film to the steel sheet. As a result, silica, which provides corrosion resistance to acids, may firmly form and maintain a film on the surface of the steel sheet, thereby contributing to increase acid resistance.

Although the silane is not particularly limited, an alkoxy silane having alkoxy groups is preferable, and using an alkoxy silane having three or more alkoxy groups may make to perform a bonding reaction with silica, silane, and a steel sheet to improve adhesion of film to the steel sheet, and dense coating may be formed and the corrosion resistance to acids may be improved.

The alkoxy silane may include, one or more selected from a group consisting for example, vinyl trimethoxy silane, vinyl triethoxy silane, vinyl tri-isopropoxy silane, 3-methacryloxypropyl trimethoxy silane, 2-glycidyloxy propyl trimethoxy silane, 2-glycidyloxy propyl triethoxy silane, 2-aminopropyl triethoxy silane, 2-ureidoalkyl triethoxy silane, tetraethoxysilane, triethoxyphenylsilane, trimethoxyphenylsilane, and compounds thereof, and they may be stabilized after hydrolysis, which are more preferable.

In the solution composition for a metal surface treatment of the present disclosure, the alkoxy silane may include 40 wt % to 60 wt % based on 100 wt % of the metal surface treatment composition. When the content of the alkoxy silane is less than 40 wt %, the alkoxy silane may not form a sufficient bonding with colloidal silica and a steel sheet, resulting in deteriorating film formation ability, and thus the corrosion resistance to acids may not be secured. On the other hand, when the content of the alkoxy silane exceeds 60 wt %, an organic gas due to pyrolysis may be discharged, and a large amount of silanol may remain, thereby deteriorating film adhesion, thereby failing to secure corrosion resistance.

The alkoxy silane and silica may form a surface treatment film of a steel sheet formed by a sol-gel reaction. Since the film formed by the alkoxy silane and silica has a rigid property, it is preferable to impart flexibility of the film in an inorganic film. Accordingly, the solution composition of the present disclosure may include an organic monomer.

A condition under which the silica and the alkoxy silane bond and react with each other is a strongly acidic condition. Under the condition, the monomer may undergo a polymer reaction and become a polymer. The polymer generated from such a monomer may fill hard inorganic substances to improve film formation ability, to provide water resistance, and provide flexibility to inorganic substance films. In addition, the monomer may undergo an additional polymerization reaction during a drying process. Since the process occurs at a temperature, lower than that of a curing process of the alkoxy silane and silane, thereby lowering a curing temperature as a whole.

The organic monomer is not particularly limited as long as it can be polymerized under the reaction condition in which silica and silane are bonded with each other, but it is more preferable to use an acrylate-based monomer. The acrylate-based monomer may be preferable since the polymerization reaction occurs under an acidic condition in which the reaction of silica and silane occurs and the monomer has an appropriate size in which the particle size of the polymer generated after the polymerization reaction is not too large.

In addition, an alcohol component may be generated by a sol-gel reaction of the alkoxy silane and silica in the actylate-based monomer. The alcohol component may increase a polymerization rate of the monomer to promote a polymerization reaction. In addition, adjustment of hardness density and adjustment of hardness may be easy, and transparency of the film may be increased, which are advantages. In case of using a cation-type monomer other than the above, obtained polymers may have a particle size which is excessively large, to cause severe gelation.

The acrylate-based monomer may include, for example, acrylic acid glacial, methyl acrylate, ethyl acrylate, N-butyl acrylate, 2-ethylhexyl acrylate, isobutyl acrylate, tertiary butyl acrylate, tertiary butyl methacrylate, butanediol monoacrylate, lauryl acrylate, dimethylaminoethyl acrylate, dihydrodicyclopentadienyl acrylate, and the like. These may be used alone or in a combination of two or more thereof.

The organic monomer may contribute to film formation during coating and a crosslinking reaction, and may be contained in the content of 5 wt % to 15 wt % based on the content of 100 wt % of the solution composition for a metal surface treatment. When the content of the organic monomer is less than 5 wt % based on 100 wt % of the solution composition for a metal surface treatment, sufficient bonding may not be formed with the silica and alkoxy silane polymer, such that the film formation ability may be deteriorated, thereby failing to secure corrosion resistance. On the other hand, when the content of the organic monomer exceeds 15 wt %, the water resistance may be lowered or the acid corrosion resistance may be reduced due to unreacted residual monomer.

The solution composition for a metal surface treatment of the present disclosure may also include an acid for an acidity control. The acid may serve to improve stability of the alkoxy silane while assisting the hydrolysis reaction of alkoxy silane, and it is preferable to adjust the acidity of the solution to a PH range of 1 to 5. For this, the acid may be contained in a content of 0.01 to 1.00 wt % based on 100 wt % of the metal surface treatment composition. When the content of the acid is less than 0.01 wt % based on 100 wt % of the solution composition for a metal surface treatment, the hydrolysis time may increase and the solution stability of the whole solution composition may be deteriorated. When the content of the acid exceeds 1.00 wt % based on 100 wt % of the solution composition for a metal surface treatment, corrosion of the steel sheet may occur and control of the molecular weight of the resin may be difficult.

Specific kinds of the acid is not particularly limited, but preferably one or more selected from a group consisting of organic acids such as acetic acid, formic acid, lactic acid, glyconic acid, and the like, organic-inorganic acids such as sulfuric acid, nitric acid, hydrochloric acid, hydrofluoric acid, and the like, and compounds thereof may be included in the solution composition for a metal surface treatment of the present disclosure.

The solution composition for a metal surface treatment of the present disclosure may include a solvent. The solvent may play a role of compatibility and hydrolysis of silane with respect to water, wetting of a resin composition for the metal surface, control of a drying rate, and the like, and the solvent may be contained in a content of 1 wt % to 15 wt % based on 100 wt % of the metal surface treatment composition. When the content of the solvent is less than 1 wt %, the compatibility may be lowered and the storage stability of the coating solution may be deteriorated and the corrosion resistance after coating may not be secured. On the other hand, when the content of the solvent exceeds 15 wt % based on 100 wt % of the metal surface treatment composition, viscosity may become too low to lower the stability of the solution and may not secure corrosion resistance after coating.

The specific kind of the solvent in the solution composition for a metal surface treatment of the present disclosure is not particularly limited, but preferably, may include one or more selected from a group consisting of methanol, ethanol, 2-propanol, 2-methoxypropanol, 2-butoxyethanol, and the like.

Further, the present disclosure may further include an organic resin. The organic resin may serve to enhance adhesion with a material to be coated and improve drying at room temperatures, and it is preferable that the organic resin includes 0.1 wt % to 5.0 wt % based on 100 wt % of the metal surface treatment composition. When the content of the organic resin is less than 0.1 wt %, a synergistic effect due to addition may be insignificant, and when the content of the organic resin exceeds 5.0 wt %, water resistance may be lowered and peeling of a coating film, or the like, may occur.

In the metal surface treatment composition of the present disclosure, the organic resin preferably has a resin having a cyclic ring structure in a resin structure. The cyclic ring structure in the resin structure may be relatively stable from various reactions and contribute to improved acid resistance.

The organic resin having the cyclic ring structure in the resin structure may include, for example, polyurethane, an amino-modified phenol resin, a polyester resin, an epoxy resin, a polyvinyl butyral, and the like. The resin may be used in a hybrid type of each of the resins described above, and these resins may be used singly or in combinations thereof.

The solution composition for a metal surface treatment according to the present disclosure may be coated onto the surface of the steel sheet, and be dried to from a surface treatment film having excellent corrosion resistance to acids. The coating is not particularly limited as long as a commonly used coating method may be applied. For example, methods of roll coating, spraying, immersion, squeezing, immersion squeezing, or the like may be applied, if required, two or more methods may be used in combination.

On the other hand, the drying may be performed by applying a method of using a hot-air drying furnace or an induction heating furnace, and the drying may be performed at a temperature ranging 150 to 420° C. on a basis of a final temperature (PMT) of a material steel sheet. When the drying temperature does not reach a temperature of 150° C. or higher on the basis of PMT, a proper solid film layer may not be formed and a liquid residual solution may be removed in a further process, failing to secure desired corrosion resistance. In addition, when the drying temperature exceeds 420° C. on the basis of PMT, an organic resin layer in the film layer may be oxidized (meaning burned), such that the structure of the film layer may change and the desired corrosion resistance may not be secured. For this, for example, when drying is performed by the hot-air drying furnace, an internal temperature of the hot-air drying furnace may be set at 150 to 420° C.

A surface treatment coating of a steel sheet according to the present disclosure is not particularly limited, and may be performed through a continuous process, wherein a speed of the continuous process may be, for example, 60 to 180 mpm(m/min).

The surface-treated coating steel sheet thus obtained may have a thickness of a film of 0.1 to 50 μm in a thickness after drying. When the thickness of the film is less than 0.1 μm, there may be a problem in which the film is insufficient and the corrosion resistance is insufficient. When the thickness of the film exceeds 50 μm, there may be a problem in which a solid film may not be formed due to insufficient drying during the coating process.

The film may be an organic-inorganic composite film, which has a bonding structure as illustrated in FIG. 1 to form a film on the surface of the steel sheet. FIG. 1 conceptually illustrates a bonding structure of a film according to the present disclosure. Accordingly, the film according to the present disclosure may be bonded by a hydrolysis reaction of silica and alkoxy silane, and other alkoxy groups of the alkoxy silane bond with the steel sheet to form a solid film on the surface of the steel sheet. Therefore, it can be said that the film according to the present disclosure has a hydrolysis reaction product of alkoxy silane and silica on the surface of the steel sheet. Alcohol may be generated in the course of the hydrolysis reaction, and the like, but the alcohol may be volatilized during the drying process. The film may provide corrosion resistance for the steel sheet, for example, provide excellent corrosion resistance to acids. An example thereof was schematically illustrated in FIG. 1.

On the other hand, the organic monomer of the present disclosure may be polymerized to be present as a polymer. The organic monomer is an acrylate-based monomer, and an acrylate-based polymer, which is a polymer of the organic monomer, may be present on the surface of the steel sheet.

As described above, the organic-inorganic composite film, formed by applying the solution composition for surface treatment of steel sheet of the present disclosure may include 25 to 65 wt % of carbon (C), 20 to 70 wt % of silicon (Si), and 1 to 40 wt % of oxygen (O). It can be confirmed by analysis methods such as electron probe micro-analysis (EPMA), energy-dispersive X-ray spectroscopy (EDS), and the like.

In this case, silicon may be present in combination with oxygen or carbon. The ratio of Si—O bonding, which the silicon bonds to oxygen, and Si—C bonding, which the silicon bonds to carbon has a range of 80 to 95% (Si—O bonding) to 5 to 20% (Si—C bonding).

On the other hand, when an organic resin is further included according to the present disclosure, the organic resin may be contained in the film in the content of 0.1 wt % to 5.0 wt %. The film of the present disclosure may obtain good corrosion resistance against sulfuric acid, and the like, even though it is applied to ordinary steel sheets, for example, to zinc-based plated steel sheets. Particularly, when the film of the present disclosure is applied to sulfuric acid resistance steel having strong corrosion resistance to acids by forming a thin film on the surface of the steel when exposed to an acidic corrosive environment, as a steel having high corrosion resistance to sulfuric acid, and the like, a synergistic reaction with the corrosion resistance of the steel itself to sulfuric acid, or the like, may occur, such that remarkably excellent sulfuric acid corrosion resistance may be obtained.

The sulfuric acid resistant steel is not particularly limited, but may be a steel sheet, for example, containing 1.5 wt % or less of C (excluding 0), 0.5 wt % or less of Si (excluding 0), 1.5 wt % or less of Mn (excluding 0), 0.02 wt % or less of S, 0.02 wt % or less of P, 0.1 wt % or less of Al, 0.008 wt % or less of N, and 0.1 to 0.5 wt % of Cu, and a remainder of Fe and other avoidable impurities. In this case, it may further include 0.03 to 0.1 wt % of Co and 0.3 wt % or less of Ni and Sb (excluding 0), and in this case, the sulfuric acid-resistant steel may be a steel in which at least one concentrated layer selected from a group consisting of Cu, Co, Ni, and Sb in a thickness of 100 to 300 nm, is formed directly below the surface.

More preferably, the sulfuric acid-resistant steel may include, for example, 0.03 to 0.1 wt % of C, 0.15 to 0.35 wt % of Si, 0.5 to 1.2 wt % of Mn, 0.01 wt % or less of S, 0.015 wt % or less of P, 0.02 to 0.06 wt % or less of Al, 0.004 wt % or less of N, and 0.2 to 0.4 wt % of Cu, and a remainder of Fe and other unavoidable impurities. In this case, the sulfuric acid-resistant steel may further include at least one of 0.1 to 0.25 wt % of Ni, 0.05 to 0.2 wt % of Sb, and 0.03 to 0.1 wt % of Co, and the sulfuric acid-resistant steel may be one in which at least one concentrated layer selected from a group consisting of Cu, Co, Ni, and Sb having a thickness of 100 to 300 nm, is formed directly below the surface.

Mode for Invention

Hereinafter, the present disclosure will be described more specifically with reference to specific examples. The following examples are provided to aid in understanding of the present disclosure, and the scope of the present disclosure is not limited thereto.

Surface Treatment Composition

After addition of tetraethoxysilane with ethanol as a solvent and acetic acid as an acidity regulator to colloidal silica Ludox HSA (solid content 30%, particle size 12 nm, W. R. Grace & Co.—Conn.), respectively, the mixture was stirred for about 5 hours while cooling such that the temperature thereof did not exceed about 50° C.

In this case, the colloidal silica may be surface-modified by silane, and the silane may be hydrolyzed. After a sufficient reaction, ethyl acrylate as a monomer and poly(meth) acrylic acid as an organic resin were separately added and reacted for about 24 hours.

The content of each component was adjusted as shown in Table 1 to prepare a surface treatment composition.

TABLE 1

| | Colloidal Sillica | Silane | Solvent | Acidity Regulator | Monomer | Organic Resin |
|---|---|---|---|---|---|---|
| Example 1 | 36.00% | 45.00% | 10.00% | 0.50% | 8.00% | 0.50% |
| Example 2 | 42.00% | 44.00% | 3.40% | 0.60% | 10.00% | 0.00% |
| Example 3 | 32.00% | 45.00% | 10.00% | 0.60% | 12.00% | 0.40% |
| Example 4 | 35.00% | 52.00% | 4.00% | 0.50% | 6.00% | 2.50% |
| Comparative Example 1 | 53.00% | 40.00% | 1.00% | 0.20% | 5.00% | 0.80% |
| Comparative Example 2 | 50.00% | 22.00% | 14.00% | 0.80% | 9.00% | 4.20% |
| Comparative Example 3 | 42.00% | 40.00% | 5.00% | 2.50% | 10.00% | 0.50% |

TABLE 1-continued

| | Colloidal Sillica | Silane | Solvent | Acidity Regulator | Monomer | Organic Resin |
|---|---|---|---|---|---|---|
| Comparative Example 4 | 45.00% | 48.00% | 0.00% | 0.50% | 6.00% | 0.50% |
| Comparative Example 5 | 35.00% | 41.00% | 5.00% | 0.60% | 18.00% | 0.40% |
| Comparative Example 6 | 36.00% | 42.00% | 4.80% | 0.20% | 7.00% | 10.00% |
| Comparative Example 7 | 30.00% | 62.00% | 1.00% | 0.70% | 5.60% | 0.70% |

A steel sheet (ANCOR-CS steel manufactured by POSCO) was immersed and removed in each of the surface treatment compositions as shown in Table 1, and then put in a hot-air drying furnace at about 250° C. and heated to 250° C. of PMT of the steel sheet to dry and cure the composition to prepare a surface-treated steel sheet, respectively.

The surface-treated steel sheet thus manufactured was immersed in an aqueous solution of 50 vol % of sulfuric acid, maintained at 70° C. for 1 hour, and then corrosion loss of a specimen was measured to example corrosion characteristics under a sulfuric acid corrosion condition, and the results thereof were shown in Table 2.

The evaluation criteria are as follows.

○: less than 15 mg/cm$^2$/hr

Δ: more than 15 and less than 65 mg/cm$^2$/hr

X: more than 65 mg/cm$^2$/hr

In addition, the surface-treated steel surface was immersed in a mixed aqueous solution of 16.9 vol % sulfuric acid and 0.35 vol % hydrochloric acid, maintained at 60° C. for 6 hours, and then corrosion loss of a specimen was measured to examine corrosion characteristics under the sulfuric acid-hydrochloric acid complex corrosion conditions, and the results thereof were shown in Table 2.

The evaluation criteria are as follows.

○: less than 3 mg/cm$^2$/hr

Δ: more than 3 and less than 6 mg/cm$^2$/hr

X: more than 6 mg/cm$^2$/hr

Film adhesion for the surface-treated steel sheet was evaluated, and the results thereof were shown in Table 2 below. The evaluation methods and evaluation criteria are as follows.

Evaluation Method

The surface of the surface-treated steel sheet having a dimension of width×length 150 cm×75 cm was lined by using a cross cut guide to form 100 squares in each of width and length at intervals of 1 mm, and a portion in which the 100 squares were formed was pushed up to a height of 6 mm using an erichsen tester, and a peeling tape (NB-1, manufactured by Ichiban Co., Ltd.) was attached to the push-up portion and then peeled off to observe whether or not the erichsen portion was peeled off.

The evaluation criteria are as follows.

○: when there is no peeling on the surface

Δ: when there is 1 to 3 of 100 peelings of the surface

X: when peeling on the surface exceeds 3 out of 100

The results of physical properties of the surface-treated steel sheets prepared in Examples 1 to 4 and Comparative Examples 1 to 7 were shown in Table 2 below.

TABLE 2

| | Sulfuric acid Corrosion Resistance | Composite Corrosion Resistance | Film Adhesion |
|---|---|---|---|
| Example 1 | ○ | ○ | ○ |
| Example 2 | ○ | ○ | ○ |
| Example 3 | ○ | ○ | ○ |
| Example 4 | ○ | ○ | ○ |
| Comparative Example 1 | x | x | x |
| Comparative Example 2 | x | x | x |
| Comparative Example 3 | Δ | x | ○ |
| Comparative Example 4 | x | x | x |
| Comparative Example 5 | x | x | ○ |
| Comparative Example 6 | x | x | ○ |
| Comparative Example 7 | x | x | Δ |

As shown in the Table 2, Examples 1 to 4 according to the present disclosure show excellent sulfuric acid corrosion resistance, composite corrosion resistance and film adhesion. In addition, surface defects such as a boiling phenomenon, or the like, did not occur during the coating and drying process, thus securing very good surface qualities.

However, the Comparative Example 1 shows the sulfuric acid corrosion resistance and the composite corrosion resistance were remarkably lowered. This is because the content of colloidal silica was excessively added and a residual silica in a reaction with silane remained in a large amount to prevent film formation.

Further, the Comparative Example 2 also showed the results in which the sulfuric acid corrosion resistance and the composite corrosion resistance were lowered. This is because the surface of the colloidal silica was not sufficiently reformed as in Comparative Example 1 due to the insufficient content of silane, and thus a large amount of residual silica interfered with the film formation.

On the other hand, the Comparative Example 3 showed that an acidity regulator was excessively added, and in the Comparative Example 3, it can be seen that the molecular weight of the organic-inorganic hybrid resin was excessively increased such that gelation of the solution occurred or the sulfuric acid corrosion resistance or the composite resistance were lowered even when coating were performed. In addition, corrosion of the steel sheet may proceed due to the residual acidity regulator.

In addition, in Comparative Example 4, it can be seen that the solvent is not included, such that gelation easily occurs in the manufacturing process of the solution composition, and the sulfuric acid corrosion resistance and the composite corrosion resistance may be lowered even when the coating is performed.

Comparative Example 5 and Comparative Example 6 illustrate a case in which a monomer and an organic resin are excessively added, respectively. It can be seen that when a content of an organic component with respect to a content of an inorganic component was excessive, the sulfuric acid corrosion resistance and the composite corrosion resistance may be deteriorated.

Comparative 7 showed that a case in which silane is excessively added, and it can be known that an organic gas due to pyrolysis may be discharged during the manufacturing process of the solution composition, and the sulfuric acid resistance is lowered after coating due to a large amount of residual silane.

Figure 2:
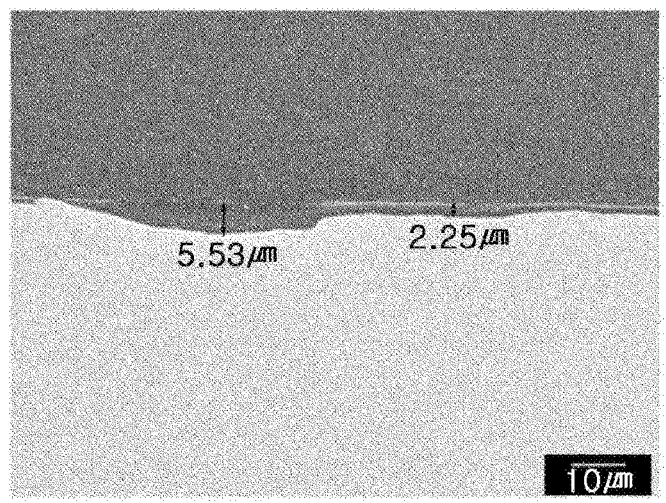
FIG. 2 is a view illustrating results of SEM images taken on a cross-section (left side) of a surface treatment steel sheet and a surface of a film (right side), obtained by Example 3, and an analysis of an element weight for the film.
Figure 2:
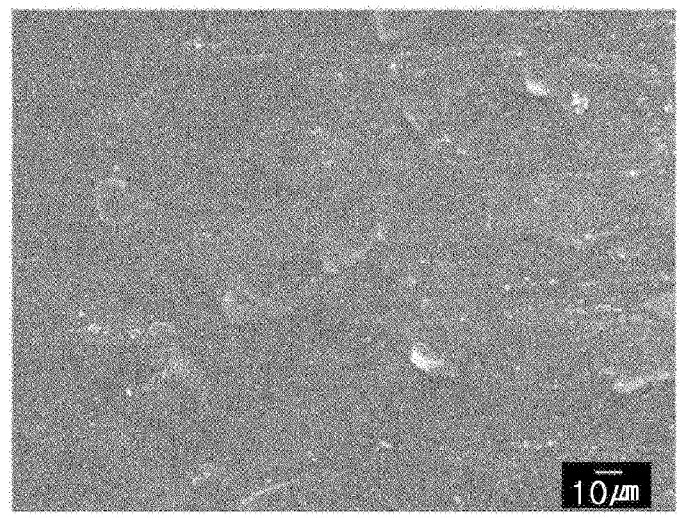

Further, SEM and EPMA analysis were performed on the surface and cross-section films of the surface-treated steel sheet obtained by the Example 3. An SEM image thus obtained was illustrated in FIG. 2. On the other hand, weights of C, S and O existing in the surface film were measured, and the results were also illustrated.

The invention claimed is:

1. A solution composition for surface treatment of a steel sheet, comprising:
   30 to 50 wt % of colloidal silica containing 5 to 20 nm-sized silica particles;
   40 to 60 wt % of silane containing at least three or more alkoxy groups;
   5 to 15 wt % of an acrylate-based organic monomer;
   0.01 to 1 wt % of acid;
   0.1 to 5.0 wt % of an organic resin having a cyclic ring structure; and
   1 to 15 wt % of a solvent,
   wherein the organic resin having the cyclic ring structure is at least one selected from the group consisting of polyurethane; an amino-modified phenolic resin; a polyester resin; and polyvinyl butyral, or a hybrid resin of two or more thereof, and
   wherein an acidity of the solution has a pH range of 1 to 5.

2. The solution composition for surface treatment of the steel sheet of claim 1, wherein the colloidal silica has a silica content of 10 to 45 wt %.

3. The solution composition for surface treatment of the steel sheet of claim 1, wherein the silane is at least one selected from the group consisting of vinyl trimethoxy silane, vinyl triethoxy silane, vinyl tri-isopropoxy silane, 3-methacryloxypropyl silane, 3-methacryloxypropyl trimethoxy silane, 2-glycidyloxy propyl trimethoxy silane, 2-glycidyloxy propyl triethoxy silane, 2-aminopropyl triethoxy silane, 2-ureidoalkyl triethoxy silane, tetraethoxysilane, triethoxyphenylsilane, and trimethoxyphenylsilane.

4. The solution composition for surface treatment of the steel sheet of claim 1, wherein the organic monomer is at least one selected from the group consisting of acrylic acid glacial, methyl acrylate, ethyl acrylate, butyl acrylate, 2-ethylhexyl acrylate, isobutyl acrylate, tertiary butyl acrylate, tertiary butyl methacrylate, butanediol monoacrylate, lauryl acrylate, dimethylaminoethyl acrylate and dihydrodicyclopentadienyl acrylate.

5. The solution composition for surface treatment of the steel sheet of claim 1, wherein the acid is one or more selected from the group consisting of acetic acid, formic acid, lactic acid, glyconic acid, sulfuric acid, nitric acid, hydrochloric acid and hydrofluoric acid.

6. The solution composition for surface treatment of the steel sheet of claim 1, wherein the solvent is at least one selected from the group consisting of methanol, ethanol, 2-propanol, 2-methoxypropanol and 2-butoxyethanol.

* * * * *